United States Patent
Xiang et al.

(10) Patent No.: US 10,019,895 B2
(45) Date of Patent: Jul. 10, 2018

(54) METHOD AND SYSTEM FOR DETECTING FREQUENT LANE CHANGES OF MOVING VEHICLES

(71) Applicant: STREAMAX TECHNOLOGY CO., LTD, Shenzhen (CN)

(72) Inventors: Huaikun Xiang, Shenzhen (CN); Jiye Sun, Shenzhen (CN)

(73) Assignee: STREAMAX TECHNOLOGY CO., LTD., Shenzhen, Guangdong (CN)

( * ) Notice: Subject to any disclaimer, the term of this patent is extended or adjusted under 35 U.S.C. 154(b) by 77 days.

(21) Appl. No.: 15/030,835

(22) PCT Filed: Jul. 18, 2014

(86) PCT No.: PCT/CN2014/082497
§ 371 (c)(1),
(2) Date: Apr. 20, 2016

(87) PCT Pub. No.: WO2015/135273
PCT Pub. Date: Sep. 17, 2015

(65) Prior Publication Data
US 2016/0253900 A1    Sep. 1, 2016

(30) Foreign Application Priority Data
Mar. 14, 2014 (CN) .......................... 2014 1 0097480

(51) Int. Cl.
*G08G 1/01*    (2006.01)
*B60W 40/09*    (2012.01)
(Continued)

(52) U.S. Cl.
CPC ........... *G08G 1/0112* (2013.01); *B60W 40/09* (2013.01); *B60W 40/10* (2013.01); *G08G 1/0125* (2013.01);
(Continued)

(58) Field of Classification Search
None
See application file for complete search history.

(56) References Cited

U.S. PATENT DOCUMENTS

| 2004/0236474 A1* | 11/2004 | Chowdhary ....... G06Q 30/0601 701/1 |
| 2004/0236475 A1* | 11/2004 | Chowdhary ....... G06Q 30/0601 701/1 |

(Continued)

FOREIGN PATENT DOCUMENTS

| CN | 101540100 | 9/2009 |
| CN | 101574970 | 11/2009 |

(Continued)

OTHER PUBLICATIONS

International Search Report for PCT/CN2014/082497, dated Nov. 26, 2014, and English translation, 6 pages total.

*Primary Examiner* — Ryan Rink
(74) *Attorney, Agent, or Firm* — Hamre, Schumann, Mueller & Larson, P.C.

(57) ABSTRACT

A method and system for detecting frequent lane changes of moving vehicles are disclosed. A method for detecting frequent lane changes of moving vehicles including extracting the Z axis angular velocity values, and storing those Z axis angular velocities, from the Z axis angular velocity of which numerical product is negative, analyzing the Z axis angular velocities stored in the specific time period, and judging the number of the Z axis angular velocities with the numeral number 0. It is determined whether the vehicle has made frequent lane changes or not in its moving process, so that an active monitoring for vehicle travelling statuses is implemented, thereby normalizing driving behaviors, and reducing traffic accidents.

7 Claims, 3 Drawing Sheets

(51) Int. Cl.
   *B60W 40/10* (2012.01)
   *G08G 1/056* (2006.01)
   *G08G 1/16* (2006.01)
   *B60W 30/045* (2012.01)
   *B60W 30/18* (2012.01)

(52) U.S. Cl.
   CPC ............ *G08G 1/056* (2013.01); *G08G 1/167* (2013.01); *B60W 30/045* (2013.01); *B60W 30/18163* (2013.01); *B60W 2420/905* (2013.01)

(56) References Cited

U.S. PATENT DOCUMENTS

2004/0236476 A1* 11/2004 Chowdhary ....... G06Q 30/0601 701/1
2004/0236596 A1* 11/2004 Chowdhary ....... G06Q 30/0601 705/26.1
2005/0216171 A1   9/2005 Heinrichs-Bartscher
2010/0023180 A1* 1/2010 Huang ................. B60W 30/12 701/1
2010/0023181 A1* 1/2010 Huang ................. B60W 30/12 701/1
2010/0209885 A1   8/2010 Chin et al.
2017/0132521 A1* 5/2017 Xu ........................ B60W 40/08

FOREIGN PATENT DOCUMENTS

| | | |
|---|---|---|
| CN | 102167041 | 8/2011 |
| CN | 102208019 | 10/2011 |
| CN | 202345598 | 7/2012 |
| CN | 102819952 | 12/2012 |
| CN | 102855638 | 1/2013 |
| CN | 103398723 | 11/2013 |
| CN | 103886749 | 6/2014 |

* cited by examiner

METHOD AND SYSTEM FOR DETECTING FREQUENT LANE CHANGES OF MOVING VEHICLES

TECHNICAL FIELD

The present application relates to the technical field of electronics, and more particularly, relates to a method and system for detecting frequent lane changes of moving vehicles.

BACKGROUND

Monitoring travelling statuses of vehicles is an important task in active safety management for public transportation vehicles. With regard to the public transportation vehicles, especially buses and taxies, if a driver of a vehicle makes lane changes frequently in the driving process of the vehicle, the driving behavior of the driver belongs to dangerous driving behaviors, which may not only be prone to disturb traffic orders and cause traffic accidents, but also make passengers feel very uncomfortable and even generate fear mentalities. Therefore, active monitoring for vehicle travelling statuses needs to be implemented, such that driving behaviors can be normalized and traffic accidents can be reduced.

Technical Problems

The embodiments of the present invention aim at providing a method and system for detecting frequent lane changes of moving vehicles, for the purpose of solving the problem that active monitoring for vehicle travelling statuses can't be implemented in the prior art.

Technical Solutions

Embodiments of the present invention provide a method for detecting frequent lane changes of moving vehicles, the method comprises following steps:

extracting Z axis angular velocities, the Z axis angular velocities are those Z axis angular velocities in triaxial angular velocities obtained by a sensor of a vehicle in a moving process of the vehicle;

if a Z axis angular velocity of which an adjacent numerical product is negative occurs in the Z axis angular velocities, storing the Z axis angular velocities in a specific time period, the specific time period is a time interval between a time point when the Z axis angular velocity of which an adjacent numerical product is negative occurs and a first time value after the time point when the Z axis angular velocity of which an adjacent numerical product is negative occurs;

if the number of Z axis angular velocities with a value of zero reaches a first threshold value in the specific time period, determining that the vehicle has made frequent lane changes in the specific time period, wherein the first threshold value is a natural number that is more than 2.

The embodiments of the present invention further provide a system for detecting frequent lane changes of moving vehicles, the system comprises:

a data extracting module configured for extracting Z axis angular velocities, the Z axis angular velocities are those Z axis angular velocities in triaxial angular velocities obtained by a sensor of a vehicle in a moving process of the vehicle;

a data storing module configured for storing Z axis angular velocities in a specific time period when a Z axis angular velocity of which an adjacent numerical product is negative occurs in the Z axis angular velocities, the specific time period is a time interval between a time point when the Z axis angular velocity of which an adjacent numerical product is negative occurs and a first time value after the time point when the Z axis angular velocity of which an adjacent numerical product is negative occurs; and a frequent lane changes judging module configured for judging that the vehicle has made frequent lane changes in the moving process in the specific time period when the number of the Z axis angular velocities with a value of 0 reaches a first threshold value in the specific time period, wherein the first threshold value is a natural number that is more than 2.

Advantageous Effects

In the method and system for detecting frequent lane changes of moving vehicles provided by the embodiments of the present invention, by extracting the Z axis angular velocity values and storing the Z axis angular velocities of which an adjacent numerical product is negative, the Z axis angular velocities stored in the specific time period are analyzed; and by judging the number of the Z axis angular velocities with the numeral value of 0, it is determined that whether the vehicle has made frequent lane changes or not, so that an active monitoring for the vehicle travelling statuses is implemented, thereby normalizing driving behaviors and reducing traffic accidents.

DETAILED DESCRIPTION OF THE PREFERRED EMBODIMENT

In order to make the purpose, the technical features and the advantages of the present application be more clear, the present application will be described in detail with reference to the accompanying drawings and embodiments. It should be understood that the specific embodiments described herein are used for interpretation of present invention merely, rather than the limitation to the present invention.

Figure 1:
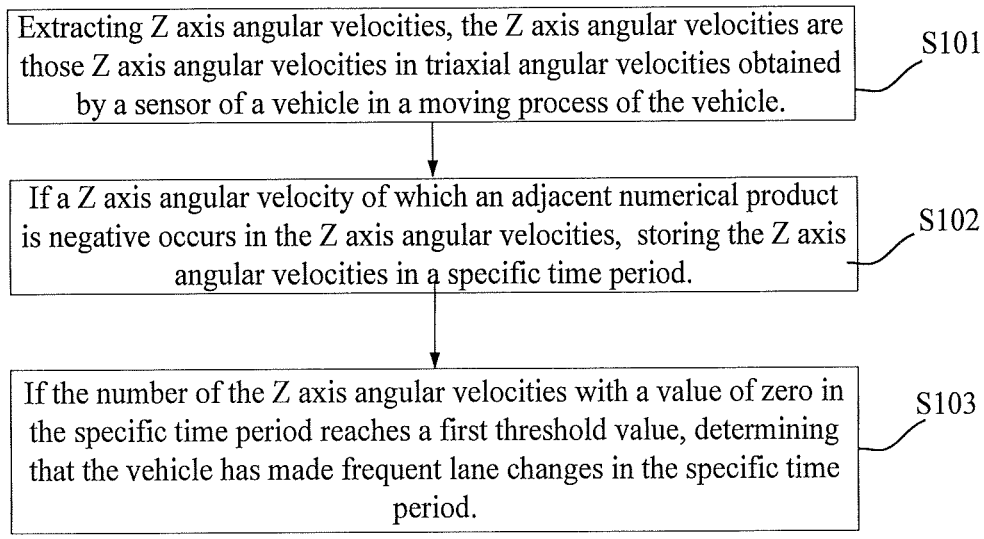
FIG. 1 illustrates one flow chart of a method for detecting frequent lane changes of moving vehicles provided by a first embodiment of the present invention.

FIG. 1 illustrates a flow chart of a method for detecting frequent lane changes of moving vehicles provided by a first embodiment of the present invention. As shown in FIG. 1, the method comprises following steps:

In step S101, extracting Z axis angular velocities, the Z axis angular velocities are Z axis angular velocities in triaxial angular velocities obtained by a sensor of a vehicle in a moving process of the vehicle.

In the present embodiment, by using a vehicular six-axes MENS (Micro Electrol Mechanical Systems) combination sensor to collect mass vehicle travelling status data in real time, triaxial accelerated speeds and triaxial angular velocities in the moving process of the vehicle can be obtained, and Z axis angular velocities can be extracted from the triaxial angular velocities. Since it only needs to extract the Z axis angular velocities and establish a one-dimensional array module for judging a driving behavior of a driver, an amount of calculated parameters for modeling of the one-dimensional array module is reduced, a detecting rate is accelerated, and a data analysis rate is increased, so that the driving behaviors of the driver can be judged by using the least parameter analysis.

In step S102, if a Z axis angular velocity of which an adjacent numerical product is negative occurs in the Z axis angular velocities, storing the Z axis angular velocities in a specific time period; the specific time period is a time interval between a time point when the Z axis angular velocity of which an adjacent numerical product is negative occurs and a first time value after the time point when the Z axis angular velocity of which an adjacent numerical product is negative occurs.

According to the extracted Z axis angular velocities, every two adjacent Z axis angular velocities are multiplied; when at least one negative product occurs, the Z axis angular velocities, from the Z axis angular velocity of which the product is negative, are stored into the one-dimensional array. It can be obtained from mass experimental analysis data that a time length of frequent lane changes of a moving vehicle lasts for about 110 ms, therefore, the specific time period can be set to be 1170 ms according to the experimental data. Besides, according to the preset specific time period of 1170 ms, if 10 ms is defined as a time unit, a size of a corresponding one-dimensional array equates a numeral value of 117 Z axis angular velocities.

In step S103, if the number of the Z axis angular velocities with a numeral value of 0 reaches a first threshold value in the specific time period, judging that the vehicle has made frequent lane changes in the specific time period, wherein the first threshold value is a natural number that is more than 2.

In the specific time period of 1170 ms, the numeral values of the 117 Z axis angular velocities that has been stored in the one-dimensional array are analyzed, and whether the number of the Z axis angular velocities with a numerical value of 0 in the 117 Z axis angular velocities is more than 2 or not is judged. If the number of the Z axis angular velocities with the numerical value of 0 is more than 2, it is judged that the current vehicle has made frequent lane changes in its moving process; and if the number of the Z axis angular velocities with the numerical value of 0 is less than or equal to 2, it is judged that the current vehicle hasn't made frequent lane changes in its moving process. Meanwhile, the numerical values of the 117 Z axis angular velocities in the one-dimensional array that has already been fully stored is emptied, and a storage event triggered by occurrence of a next Z axis angular velocity of which an adjacent numerical product is negative is waited.

Figure 2:
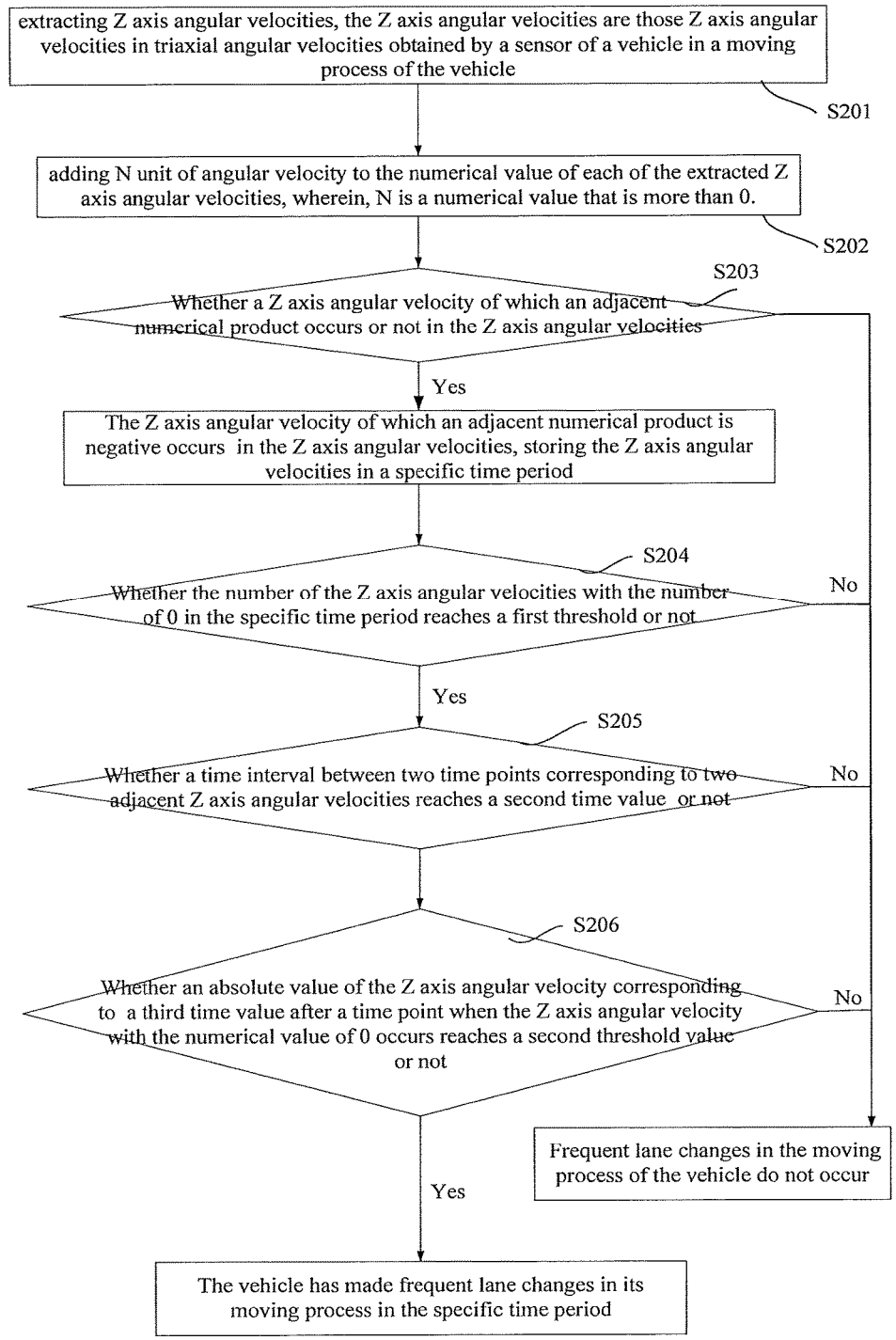
FIG. 2 illustrates another flow chart of the method for detecting frequent lane changes of moving vehicles provided by a second embodiment of the present invention.

FIG. 2 illustrates another method for detecting frequent lane changes of moving vehicles provided by a second embodiment of the present invention, a specific implementation process of the method is introduced in the following:

Step S201, extracting Z axis angular velocities, the Z axis angular velocities are Z axis angular velocities in triaxial angular velocities obtained by a sensor of a vehicle in moving process of the vehicle.

In the present embodiment, by using a vehicular six-axes MENS (Micro Electrol Mechanical Systems) combination sensor configured to collect mass vehicle travelling status data in real time, triaxial accelerated speeds, and triaxial angular velocities in the moving process of the vehicle can be obtained, and Z axis angular velocities can be extracted from the triaxial angular velocities. Since it only needs to extract the Z axis angular velocities and establish one-dimensional array module for judging a driving behavior of a driver, an amount of calculated parameters for modeling of the one-dimensional array module is reduced, a detecting rate is accelerated, a data analysis rate is increased, and the driving behavior of the driver can be judged by using the least parameter analysis.

Step S202, adding N units of angular velocity values to the numerical value of each of the extracted Z axis angular velocities, wherein, N is a numerical value that is more than 0.

In the present embodiment, due to small numerical values of the actually obtained Z axis angular velocities, in order to observe conveniently in a figure and calculate conveniently for those numerical values stored into the one-dimensional array, N units of angular velocity values are added into the numerical value of each of the extracted Z axis angular velocities, that is, a curved line is moved upwardly for N units in the figure.

Step S203, judging whether a Z axis angular velocity of which an adjacent numerical product is negative occurs or not, if yes, storing the Z axis angular velocities in a specific time period; if not, judging that a driving behavior of frequent lane changes doesn't occur; the specific time period is a time interval between a time point when the Z axis angular velocity of which an adjacent numerical product is negative occurs and a first time value after the time point when the Z axis angular velocity of which an adjacent numerical product is negative occurs.

In the present embodiment, according to the extracted Z axis angular velocities, every two adjacent Z axis angular velocities are multiplied; when at least one negative product occurs, the Z axis angular velocities, from the Z axis angular velocity of which the product is negative, are stored into the one-dimensional array. It can be obtained from mass experimental analysis data that a time of frequent lane changes of a moving vehicle lasts for about 110 ms, thus, the specific time period can be set to be 1170 ms according to the experimental data. Besides, according to the preset specific time period of 1170 ins, if 10 ms is defined as one time unit, the corresponding one-dimensional array equates a numeral value of 117 Z axis angular velocities.

In addition, as for those Z axis angular velocities stored in the specific time period, in order to ensure that data can be updated in real time and pre-stored data won't be replaced or damaged by following data, at least two memorizers can be arranged. For example, a first memorizer can be arranged and configured for storing data updated always in real time, when numerical value of the Z axis angular velocities in the specific time period are all stored in the first memorizer, or a storage size of data stored in the first memorizer reaches a storage size of data that can be stored in the specific time period, the numerical values in the first memorizer are now transferred into and stored in a second memorizer, and the numerical values in the first memorizer shall be emptied, such that the first memorizer can be used for continuously storing new data updated in real time.

Step S204, judging whether the number of the Z axis angular velocities with a numerical value of 0 reaches a first threshold value in the specific time period or not, if yes, executing a step S205, if not, judging that frequent lane change behaviors do not occur in travelling; wherein, N is a natural value that is more than 2.

In the present embodiment, in the specific time period of 1170 ms, the numeral values of the 117 Z axis angular velocities that has been stored in the one-dimensional array are analysed, and whether the number of the Z axis angular velocities with a numerical value of 0 in the 117 Z axis angular velocities is more than 2 or not is judged. If the number of the Z axis angular velocities with the numerical value of 0 is more than 2, executing the step S205, if the number of the Z axis angular velocities with the numerical value of 0 is less than or equal to 2, it is considered that the current vehicle hasn't made frequent lane changes in its moving process. Meanwhile, the numerical values of the 117 Z axis angular velocites in the one-dimensional array that has already been fully stored is emptied, and a storage incident triggered by an occurrence of a next Z axis angular velocity of which an adjacent numerical product is negative is waited.

Step S205, judging whether the time interval between two time points corresponding to two adjacent Z axis angular velocities with the numerical value of 0 reaches a second time period or not, if yes, executing a step S206; if not, judging that the driving behavior of frequent lane changes doesn't occur.

As vehicles have slight vibrations in moving process, in order to avoid little errors caused by the vibrations and improve accuracy of data analysis, Z axis angular velocities with the numerical value of 0 need to be further analyzed and processed. In the Z axis angular velocities pre-stored in the specific time period, whether a time interval between two time points corresponding to two adjacent Z axis angular velocities with the numerical value of 0 reaches the second time value or not is judged, wherein the second time value can be set to be 70 ms according to actual experimental data.

Step S206, judging whether an absolute value of the Z axis angular velocity that corresponds to a third time value after the time point when a numerical value of a Z axis angular velocity is 0 reaches a second threshold value or not, if yes, it is judged that frequent lane changes of the moving vehicle occurs in the specific time period, and if not, it is judged that frequent lane changes of the moving vehicle doesn't occur.

In order to avoid low-amplitude oscillations caused by the vibrations, which may cause erroneous judgments for moving process of the vehicle, those Z axis angular velocities with the numerical number of 0 need to be further analyzed and processed. In the Z axis angular velocities pre-stored in the specific time period, it is judged that whether an absolute value of the Z axis angular velocity that corresponds to a third time value after the time point when a numerical value of a Z axis angular velocity is 0 reaches a second threshold value or not, for example, a Z axis angular velocity with a current numerical value of 0 lies in 100 ms of the 1170 ms, the third time value is set to be 50 ms, and the second threshold value is set to be 0.10, whether the absolute value of the Z axis angular velocity located at 50 ms after where the Z axis angular velocity with the numerical value of 0 lies (i.e., located at 150 ms) is bigger than 0.10 or not is judged.

Figure 3:
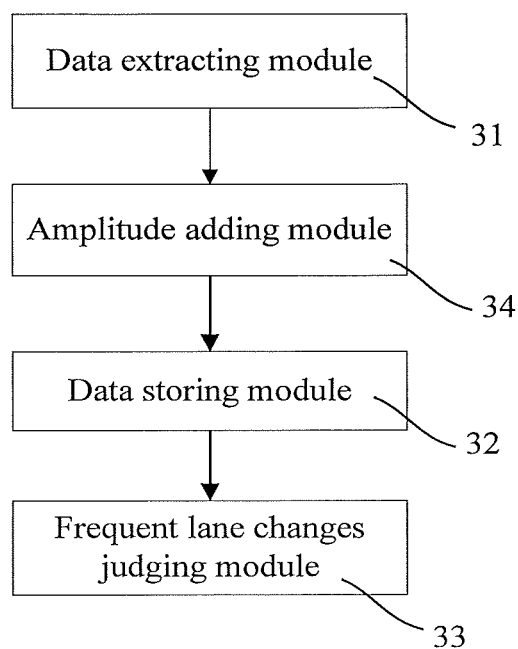
FIG. 3 illustrates a schematic diagram of a system for detecting frequent lane changes of moving vehicles provided by a third embodiment of the present invention.

FIG. 3 illustrates a schematic diagram of a system for detecting frequent lane changes of moving vehicles provided by a third embodiment of the present invention, the system comprises a data extracting module 31, a data storing module 32 and a frequent lane changes judging module 33. The system is described in detail hereinafter:

The data extracting module 31 is configured for extracting Z axis angular velocities, the Z axis angular velocities are those Z axis angular velocities in triaxial angular velocities obtained by a sensor of a vehicle in a moving process of the vehicle. In the present embodiment, by using a vehicular six-axes MENS (Micro Electrol Mechanical Systems) combination sensor configured to collect mass vehicle travelling status data in real time, triaxial accelerated speeds, and triaxial angular velocities in the moving process of the vehicle can be obtained, and Z axis angular velocities can be extracted from the triaxial angular velocities. Since it only needs to extract Z axis angular velocities and establish a one-dimensional array module for judging a driving behavior of a driver, an amount of calculated parameters for modeling of the one-dimensional array module is reduced, a detecting rate is accelerated, a data analysis rate is increased, and the driving behavior of the driver can be judged by using the least parameter analysis.

The data storing module 32 is configured for storing Z axis angular velocities in a specific time period when a Z axis angular velocity of which an adjacent numerical product in the Z axis angular velocities is negative occurs, the specific time period is a time interval between a time point when the Z axis angular velocity of which an adjacent numerical product is negative occurs and a first time value after the time point when the Z axis angular velocity of which an adjacent numerical product is negative occurs. According to the extracted Z axis angular velocities, every two adjacent Z axis angular velocities are multiplied, when at least one negative product occurs, the Z axis angular velocities, from the Z axis angular velocity of which the numerical product is negative, are stored into the one-dimensional array. It can be obtained from mass experimental analysis data that a time length of frequent lane changes of a moving vehicle lasts for about 110 ms, therefore, the specific time period can be set to be 1170 ms according to the experimental data. Besides, according to the preset specific time period of 1170 ms, if 10 ms is defined as a time unit, a size of a corresponding one-dimensional array equates a numeral value of 117 Z axis angular velocities.

The frequent lane changes judging module 33 is configured for judging that the vehicle has made frequent lane changes in the specific time period if the number of the Z axis angular velocities with a numeral value of zero reaches a first threshold value in the specific time period, wherein the first threshold value is a natural number that is more than 2. In the specific time period of 1170 ms, the numeral value of 117 Z axis angular velocities that has been stored in the one-dimensional array is analysed, and whether the number of the Z axis angular velocities with a numerical value of 0 in the 117 Z axis angular velocities is more than 2 or not is judged. If the number of the Z axis angular velocities with the numerical value of 0 is more than 2, it is judged that the current vehicle has made frequent lane changes in its moving process, and if the number of the Z axis angular velocities with the numerical value of 0 is less than or equal to 2, it is judged that the current vehicle hasn't made frequent lane changes in its moving process. Meanwhile, the numerical values of the 117 Z axis angular velocites in the one-dimensional array that has already been fully stored is emptied, and a storage event triggered by an occurrence of a next Z axis angular velocity of which an adjacent numerical product is negative is waited.

Further, due to small numerical values of the actually obtained Z axis angular velocities, in order to observe conveniently in a figure and calculate conveniently for those numerical values stored in the one-dimensional array, the system further comprises an amplitude adding module 34 which is configured for adding N units of angular velocities to the numerical value of each of the extracted Z axis angular velocities, wherein, N is a numerical value that is more than 0.

Furthermore, in the present embodiment, in order to avoid low-amplitude oscillations caused by the vibrations, which may cause erroneous judgment in the travelling process of the vehicle, those Z axis angular velocities with the numerical number of 0 need to be further analyzed and processed, the frequent lane changes judgment module 33 is further configured for judging that a time interval between two time points corresponding to two adjacent Z axis angular velocities with the numerical value of 0 reaches a second time value, and judging that an absolute value of the Z axis angular velocity that corresponds to a third time value after a time point when the Z axis angular velocity with the numerical value of 0 occurs reaches a second time threshold value.

For example, in the Z axis angular velocities pre-stored in the specific time period, whether a time interval between two time points corresponding to every two adjacent Z axis angular velocities with the numerical value of 0 reaches the second time value or not is further judged, the second time value can be set to be 70 ms according to actual experimental data; in the Z axis angular velocities pre-stored in the specific time period, whether the absolute value of the Z axis angular velocity that corresponds to the third time value after the time point when a numerical value of a Z axis angular velocity is 0 reaches a second threshold or not is judged, for example, a Z axis angular velocity with a current numerical value of 0 lies in 100 ms of the 1170 ms, the third time value is set to be 50 ms, the second threshold value is set to be 0.10, whether the absolute value of the Z axis angular velocity located at 50 ms after where the Z axis angular velocity with the numerical value of 0 lies (i.e., located at 150 ms) is bigger than 0.10 or not is judged.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

The invention claimed is:

1. A method for detecting frequent lane changes of moving vehicles, comprising following steps:
    extracting Z axis angular velocities from triaxial angular velocities obtained by a sensor of a vehicle in a moving process of the vehicle;
    multiplying every two adjacent Z axis angular velocities;
    storing the Z axis angular velocities in a time period, the time period starting at a time corresponding to when a result of multiplying two adjacent Z axis angular velocities is negative and lasting for a first time value;
    determining whether a time interval between two time points corresponding to adjacent Z axis angular velocities with a numeral value of zero reaches a second time value when the number of the Z axis angular velocities with a value of zero reaches a first threshold value in the time period, and when the time interval reaches the second time value, determining whether an absolute value of a Z axis angular velocity of the vehicle at a third time value, which occurs after the time when a Z axis angular velocity of the vehicle is zero, reaches a second threshold value;
    determining that the vehicle has made frequent lane changes in the moving process in the time period, when it is determined that the absolute value of the Z axis angular velocity of the vehicle at the third time reaches the second threshold value,
    wherein the first threshold value is a natural number that is more than 2.

2. The method according to claim 1, wherein before the step of storing the Z axis angular velocities in the time period the method further comprises:
    adding N units of angular velocity values to the numerical value of each of the extracted Z axis angular velocities, wherein, N is a numerical value that is more than 0.

3. A system for detecting frequent lane changes in moving vehicles, comprising:
    a data extracting module configured for extracting Z axis angular velocities from tri-axial angular velocities obtained by a sensor of a vehicle in a moving process of the vehicle;
    a data storing module configured for storing Z axis angular velocities in a time period when a result of multiply operation of two adjacent Z axis angular velocities is negative in the Z axis angular velocities; the specific time period starts from a time point when the result of multiply operation of two adjacent Z axis angular velocities is negative and lasts for a first time value; and
    a frequent lane changes judging module configured for:
    when the number of the Z axis angular velocities with a value of zero reaches a first threshold value in the time period, judging whether a time interval between two time points corresponding to adjacent Z axis angular velocities with a numeral value of zero reaches a second time value; when the time interval between two time points corresponding to adjacent Z axis angular velocities with a numeral value of zero reaches the second time value, further judging whether an absolute value of a Z axis angular velocity of the vehicle at a third time value after the time when a Z axis angular velocity of the vehicle is 0 reaches a second threshold value;
    when the absolute value of the Z axis angular velocity of the vehicle at a third time value after the time when the Z axis angular velocity of the vehicle is 0 reaches the second threshold value, determining that the vehicle has made frequent lane changes in the moving process in the time period;
    wherein the first threshold value is a natural number that is more than 2.

4. The system according to claim 3, wherein the system further comprises:
    an amplitude adding module configured for adding N unit of angular velocity to the numerical value of each of the extracted Z axis angular velocities, wherein, N is a numerical value that is more than 0.

5. The method according to claim 1, wherein extracting Z axis angular velocities from tri-axial angular velocities obtained by a sensor of a vehicle in a moving process of the vehicle specifically comprises:
    using a vehicular six-axes MENS combination sensor to collect mass vehicle travelling status data in real time, triaxial accelerated speeds, and triaxial angular velocities in the moving process of the vehicle, and extracting the Z axis angular velocities from the collected mass vehicle travelling status data.

6. The method according to claim 1, wherein storing the Z axis angular velocities obtained in the time period specifically comprises:
    arranging a first memorizer and a second memorizer for storing the Z axis angular velocities; and
    storing data in real time in the first memorizer, and transferring the numerical values in the first memorizer into the second memorizer when the Z axis angular velocities in the time period are all stored in the first memorizer, or a storage size of data stored in the first memorizer reaches a limit of data that can be stored in the time period.

7. The method according to claim 5, further comprising: emptying the numerical values in the first memorizer which has already been fully stored, and waiting for a next storage incident that is triggered by another occurrence of a result of multiplying two adjacent Z axis angular velocities being negative.

* * * * *